United States Patent
Shifman

(10) Patent No.: US 9,947,042 B2
(45) Date of Patent: *Apr. 17, 2018

(54) METHOD FOR PROVIDING ON-DEMAND DIGITAL REPRESENTATIONS TO MOBILE DEVICES AND OTHER COMPUTERS IN OTHER GEOGRAPHIC LOCATIONS BY AUCTION AND/OR SALE

(71) Applicant: Ouri Shifman, Los Angeles, CA (US)

(72) Inventor: Ouri Shifman, Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/361,430

(22) Filed: Nov. 27, 2016

(65) Prior Publication Data

US 2017/0132698 A1    May 11, 2017

Related U.S. Application Data

(63) Continuation-in-part of application No. 15/276,814, filed on Sep. 27, 2016, which is a continuation of application No. 14/745,436, filed on Jun. 21, 2015, now Pat. No. 9,483,564, which is a continuation of application No. 14/145,942, filed on Jan. 1, 2014, now Pat. No. 9,094,791.

(51) Int. Cl.
| | |
|---|---|
| *H04W 64/00* | (2009.01) |
| *G06Q 30/08* | (2012.01) |
| *H04W 4/02* | (2018.01) |
| *G06F 17/30* | (2006.01) |
| *H04L 29/06* | (2006.01) |
| *G06T 1/00* | (2006.01) |
| *H04N 21/258* | (2011.01) |
| *H04L 29/08* | (2006.01) |

(52) U.S. Cl.
CPC ....... *G06Q 30/08* (2013.01); *G06F 17/30041* (2013.01); *G06F 17/3087* (2013.01); *H04L 65/4084* (2013.01); *H04W 4/02* (2013.01); *H04W 4/021* (2013.01); *G06T 1/0007* (2013.01); *H04L 67/28* (2013.01); *H04N 21/25841* (2013.01)

(58) Field of Classification Search
CPC ........ H04L 51/32; H04W 4/028; H04W 4/02; H04W 64/00; H04M 1/72572; G06F 21/32; G06F 3/044; G06Q 30/0609; G06Q 30/0641
USPC ................... 455/457, 416, 456.6; 348/14.02; 715/751
See application file for complete search history.

(56) References Cited

U.S. PATENT DOCUMENTS

| | | |
|---|---|---|
| 8,285,639 B2 | 10/2012 | Eden et al. |
| 2006/0152592 A1 | 7/2006 | Chishima et al. |
| 2009/0187492 A1 | 7/2009 | Hammad et al. |
| 2010/0024017 A1 | 1/2010 | Ashfeild et al. |
| 2010/0141736 A1 | 6/2010 | Hack |
| 2011/0035318 A1 | 2/2011 | Hargrove et al. |
| 2011/0302504 A1* | 12/2011 | Khare ............ H04L 51/32 715/751 |
| 2012/0203663 A1 | 8/2012 | Sinclair et al. |

(Continued)

FOREIGN PATENT DOCUMENTS

KR    101046504    7/2014

*Primary Examiner* — Phuoc H Doan
(74) *Attorney, Agent, or Firm* — Mark M. Friedman

(57) ABSTRACT

Methods and systems are disclosed for obtaining various digital representations and then providing and auction and/or sale of the digital representations.

22 Claims, 11 Drawing Sheets

(56) References Cited

U.S. PATENT DOCUMENTS

| | | |
|---|---|---|
| 2013/0030934 A1 | 1/2013 | Bakashi et al. |
| 2013/0073388 A1* | 3/2013 | Heath .................... G06Q 50/01 705/14.53 |
| 2013/0082103 A1 | 4/2013 | Aaron et al. |
| 2013/0243250 A1 | 9/2013 | France et al. |
| 2014/0250009 A1 | 9/2014 | Carlson |
| 2015/0058125 A1 | 2/2015 | Moshfeghi |

* cited by examiner

METHOD FOR PROVIDING ON-DEMAND DIGITAL REPRESENTATIONS TO MOBILE DEVICES AND OTHER COMPUTERS IN OTHER GEOGRAPHIC LOCATIONS BY AUCTION AND/OR SALE

CROSS REFERENCES TO RELATED APPLICATIONS

This application is a continuation in part of commonly owned U.S. patent application Ser. No. 15/276,814, entitled: METHOD FOR PROVIDING ON-DEMAND DIGITAL REPRESENTATIONS TO MOBILE DEVICES IN OTHER GEOGRAPHIC LOCATIONS, filed on Sep. 27, 2016, which is a continuation of commonly owned U.S. patent application Ser. No. 14/745,436, entitled: METHOD FOR PROVIDING ON-DEMAND DIGITAL REPRESENTATIONS TO MOBILE DEVICES IN OTHER GEOGRAPHIC LOCATIONS, filed on Jun. 21, 2015, now, U.S. Pat. No. 9,483,564, which is a continuation of commonly owned U.S. patent application Ser. No. 14/145,942, entitled: METHOD FOR PROVIDING ON-DEMAND DIGITAL REPRESENTATIONS TO MOBILE DEVICES IN OTHER GEOGRAPHIC LOCATIONS, filed on Jan. 1, 2014, now, U.S. Pat. No. 9,094,791. The disclosures of all of the aforementioned patent applications are incorporated by reference in their entirety herein.

TECHNICAL FIELD

The present invention relates to a method for administering an auction for photographs, videos and other digital media.

BACKGROUND

Auctions conducted over the Internet, such as E-bay®, for goods, and Priceline® for travel, hotel, and transport services, have been in existence for years. However, these auctions are completely unsuitable for handling digital media efficiently and effectively.

SUMMARY OF THE INVENTION

According to the present invention there is provided a method for providing an on-demand digital representation of a geographic location including, at a host computer: (a) receiving from a requesting mobile device located in a first geographic location a request for a digital representation depicting a second geographic location; (b) geolocating a plurality of providing mobile devices and identifying a subset of the plurality of providing mobile devices which are located within a predetermined distance from the second geographic location; (c) delivering to at least one such identified providing mobile device a description of the requested digital representation; (d) receiving from at least one such identified providing mobile device a digital representation which satisfies the request; and (e) forwarding the received digital representation to the requesting mobile device.

Preferably the method includes: (f) if no digital representation is received in response to the delivering of the description, repeating steps (b) through (c) until a termination condition is satisfied, the termination condition including receipt of the digital representation or expiration of a deadline; (g) upon receiving the request from the requesting mobile device, performing a computerized search through a searchable collection of digital representations for a digital representation which satisfies the request; and (h) upon receiving the digital representation from one of the identified providing mobile devices, adding a copy of the received digital representation to a searchable collection of digital representations. Preferably the digital representation is a photograph depicting the second geographic location, or a video depicting the second geographic location.

According to the present invention there is further provided a non-transitory computer readable storage medium having computer readable code embodied thereon, the computer readable code for providing an on demand digital representation of a geographic location including: (a) program code for receiving from a requesting mobile device located in a first geographic location a request for a digital representation depicting a second geographic location; (b) program code for geolocating a plurality of providing mobile devices and identifying a subset of the plurality of providing mobile devices which are located within a predetermined distance from the second geographic location; (c) program code for delivering to at least one such identified providing mobile device a description of the requested digital representation; (d) program code for receiving from at least one such identified providing mobile device a digital representation which satisfies the request; and (e) program code for forwarding the received digital representation to the requesting mobile device.

Preferably the medium includes: (f) program code for if no digital representation is received in response to the delivery, repeating steps (b) through (c) until a termination condition is satisfied; (g) program code for: upon receiving the request from the requesting mobile device, performing a computerized search through a searchable collection of digital representations for a digital representation which satisfies the request: and (h) program code for: upon receiving the digital representation from one of the identified providing mobile devices, adding a copy of the received digital representation to a searchable collection of digital representations.

According to the present invention there is further provided a non-transitory computer readable storage medium having computer readable code embodied thereon, the computer readable code for providing an on demand digital representation of a geographic location including: (a) program code for receiving from a host computer a request for a digital representation depicting a first geographic location located within a predetermined distance from a current location of the medium, the request originating from a requesting mobile device in a second geographic location; and (b) program code for sending to the host computer in response to the request a digital representation depicting the first geographic location which satisfies the request.

Preferably the medium includes: (c) program code for allowing a user to define a max distance for providing digital representations, and where the predetermined distance is the max distance as defined by the user.

According to the present invention there is further provided a server including: a processor and a non-volatile memory, operationally coupled to the processor, on which is stored executable code readable by the processor, the code including instructions that when executed by the processor causes the server to provide an on demand digital representation of a geographical location by (a) receiving from a requesting mobile device located in a first geographic location a request for a digital representation depicting a second geographic location; (b) geolocating a plurality of providing mobile devices and identifying a subset of the plurality of providing mobile devices which are located within a predetermined distance from the second geographic location; (c) delivering to at least one such identified providing mobile device a description of the requested digital representation; (d) responsive to the delivering of the description, receiving from at least one such identified providing mobile device a digital representation which satisfies the request; and (e) forwarding the received digital representation to the requesting mobile device.

Preferably the code includes instructions for: (f) if no digital representation is received in response to the delivery, repeating steps (b) through (c) until a termination condition is satisfied; (g) upon receiving the request from the requesting mobile device, performing a computerized search through a searchable collection of digital representations for a digital representation which satisfies the request; and (h) upon receiving the digital representation from one of the identified providing mobile devices, adding a copy of the received digital representation to a searchable collection of digital representations.

Other embodiments of the present invention are directed to a computer-implemented method of providing an on-demand digital representation of a geographic location. The method comprises: receiving, from a requesting mobile device located in a first geographic location, a request for a digital representation depicting a second geographic location, at least partially over a communications network. The request is then responded to by: geolocating a plurality of providing mobile devices and identifying a subset of the plurality of providing mobile devices which are located within a predetermined distance from the second geographic location; and, transmitting to at least one such identified providing mobile device, at least partially over the communications network, a description of the requested digital representation. Next, responsive to the transmitting of the description, receiving from at least one such identified providing mobile device, a digital representation which satisfies the request, at least partially over the communications network; and, administering an auction for the received digital representation.

Optionally, the administering the auction includes receiving bids for the received digital representation and accepting at least one bid as a winning bid for the received digital representation.

Optionally, the entity with the winning bid receives the received digital representation exclusively for a predetermined time period.

Optionally, an image of the received digital representation is displayed on a web page, accessible over the communications network.

Optionally, the web page includes a mobile web page.

Optionally, the web page includes a desktop web page.

Optionally, the received digital representation is placed for sale after a predetermined time period.

Optionally, the predetermined time period is after the predetermined time period for exclusivity.

Optionally, the received digital representation is placed for sale by an image of the received digital representation the being displayed on a web page.

Optionally, the method further comprises: if no digital representation is received in response to the transmitted description of the requested digital representation, repeating: geolocating a plurality of providing mobile devices and identifying a subset of the plurality of providing mobile devices which are located within a predetermined distance from the second geographic location; and, transmitting to at least one such identified providing mobile device, at least partially over the communications network, a description of the requested digital representation; until a termination condition is satisfied.

Optionally, the termination condition includes receipt of the digital representation.

Optionally, the termination condition includes expiration of a deadline.

Optionally, the digital representation includes data for at least one of a photograph, video, and a movie.

Other embodiments of the invention are directed to a computer usable non-transitory storage medium having a computer program embodied thereon for causing a suitable programmed system to provide an on-demand digital representation of a geographic location, by performing the following steps when such program is executed on the system. The steps comprise:

(a) receiving, from a requesting mobile device located in a first geographic location, a request for a digital representation depicting a second geographic location, at least partially over a communications network;

(b) responding to the request including:
geolocating a plurality of providing mobile devices and identifying a subset of the plurality of providing mobile devices which are located within a predetermined distance from the second geographic location; and,
transmitting to at least one such identified providing mobile device, at least partially over the communications network, a description of the requested digital representation;

(c) responsive to the transmitting of the description, receiving from at least one such identified providing mobile device, a digital representation which satisfies the request, at least partially over the communications network; and, (d) administering an auction for the received digital representation.

The auction is, for example, an electronic auction with access thereto over the communications network.

Optionally, the administering an auction for the received digital representation includes administering the auction via at least one of a desktop web page or a mobile web page, accessible over the communications network.

Optionally, wherein the digital representation includes data for at least one of a photograph, video, and a movie.

Embodiments of the invention are directed to a computerized system for administering an auction for digital representations over a communications network. The system comprises: a storage medium for storing computer components; and, a computerized processor for executing the computer components. The computer components comprise: (a) a computer module for receiving, from a requesting mobile device located in a first geographic location, a request for a digital representation depicting a second geographic location, at least partially over a communications network; (b) a computer module for responding to the request including: geolocating a plurality of providing mobile devices and identifying a subset of the plurality of providing mobile devices which are located within a predetermined distance from the second geographic location; and, transmitting to at least one such identified providing mobile device, at least partially over the communications network, a description of the requested digital representation; (c) a computer module responsive to the transmitting of the description, receiving from at least one such identified providing mobile device, a digital representation which satisfies the request, at least partially over the communications network; and, (d) a computer module for administering an auction for the received digital representation.

Optionally, the computerized system is such that the administering an auction for the received digital representation includes administering the auction via at least one of a desktop web page or a mobile web page.

Optionally, the computerized system is such that the digital representation includes data for at least one of a photograph, video, and a movie.

This document references terms that are used consistently or interchangeably herein. These terms, including variations thereof, are as follows.

The terms "click", "clicks", "click on", "clicks on", "activates", and "activation", involves the activation of a computer pointing apparatus, such as a device commonly known as a mouse, or a touch, swipe, contact, or the like on a touch screen, on a location on a computer screen display, including screen displays of tablets and mobile telephones, e.g., smartphones. The screen displays are activatable, for example, by an activatable icon, that causes an action of the various software and or hardware, including that for executing applications and supporting the computer screen display.

Throughout this document, a "web site" is a related collection of World Wide Web (WWW) files that includes a beginning file or "web page" called a home page, and typically, additional files or "web pages." The term "web site" is used collectively to include "web site" and "web page(s)." The referenced web pages are suitable for all types of computers, for example, as desktop web pages, suited for computers such as laptops, desktops, tablets and the like, and mobile web pages, suitable for mobile computers, such as smart phones, tablets and the like.

A uniform resource locator (URL) is the unique address for a file, such as a web site or a web page, that is accessible over Networks including the Internet.

A "computer" includes machines, computers and computing or computer systems (for example, physically separate locations or devices), servers, computer and computerized devices, processors, processing systems, computing cores (for example, shared devices), and similar systems, workstations, modules and combinations of the aforementioned. The aforementioned "computer" may be in various types, such as a personal computer (e.g., laptop, desktop, tablet computer), or any type of computing device, including mobile devices that can be readily transported from one location to another location (e.g., smartphone, personal digital assistant (PDA), mobile telephone or cellular telephone).

A server is typically a remote computer or remote computer system, or computer program therein, in accordance with the "computer" defined above, that is accessible over a communications medium, such as a communications network or other computer network, including the Internet. A "server" provides services to, or performs functions for, other computer programs (and their users), in the same or other computers. A server may also include a virtual machine, a software based emulation of a computer.

An "application", includes executable software, and optionally, any graphical user interfaces (GUI), through which certain functionality may be implemented.

A "client" is an application that runs on a computer, workstation or the like and relies on a server to perform some of its operations or functionality.

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings:

FIGS. 5A, 5B-1, 5B-2, 5C-1 and 5C-2 are screen diagrams detailing the auction embodiment of the present invention; and, FIG. 6 is a flow diagram of the auction embodiment of the present invention.

DETAILED DESCRIPTION OF THE DRAWINGS

The principles and operation of a method and system for on demand digital representations to mobile devices in other geographic locations according to the present invention may be better understood with reference to the drawings and the accompanying description.

Figure 1:
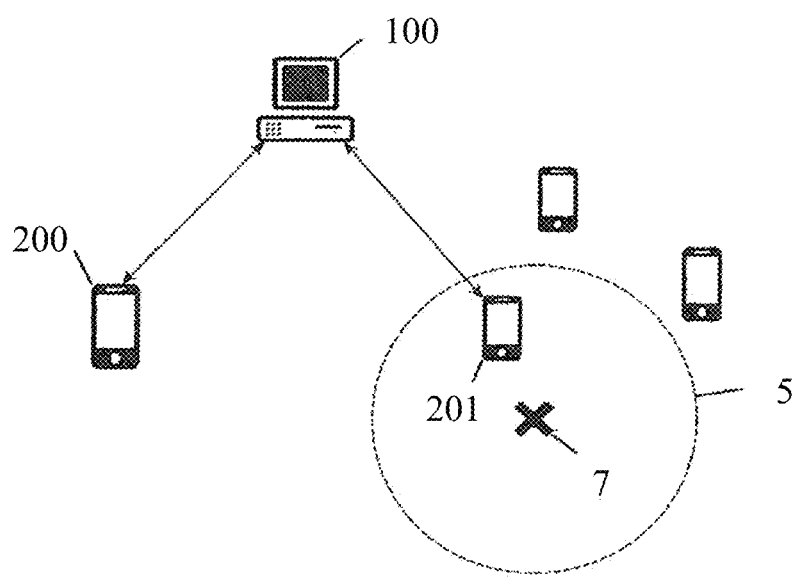
FIG. 1 is a high level diagram illustrating the present invention.

Referring now to FIG. 1, a user operating a User Equipment (UE) 200 sends a request to a host computer 100 for a location-specific photo or video, including a description of the target object or location. By "location-specific", this is the object of the photo or video is a specific location or target object. Preferably, UE 200 is a mobile computing device such as a smartphone, tablet, laptop, PDA, etc. Preferably, UE 200 has an attached camera for capturing photo and video. Preferably UE 200 is capable of being geolocated by host computer 100. Methods of geolocating mobile devices such as UE 200 are well known in the art. For example, a mobile device may be geolocated by a host computer using the mobile device's integrated GPS receiver, by triangulation techniques which measure cell phone transmissions to nearby base station antennae, or by the mobile device's Internet IP address and/or communications with wireless access points, or other known methods.

Host computer 100 receives a request for an image of a target object (or location) 7 from UE 200. "Image" can be either a still image or a moving image, i.e. video. In one embodiment the request can also include details of the image sought, for example the viewing angle, distance, time-frame, number of images or any other specific requests. Host computer 100 locates one or more mobile cameras 201 within a predetermined distance 5 from target object/location 7. In a preferred embodiment, mobile camera 201 is a UE with an integrated camera such as a smartphone, however any camera capable of receiving requests for images is contemplated within the present invention. Mobile camera 201 captures the requested image and sends it to host computer 100 Host computer 100 forwards the image, or a download link thereto, to UE 200.

Figure 2:
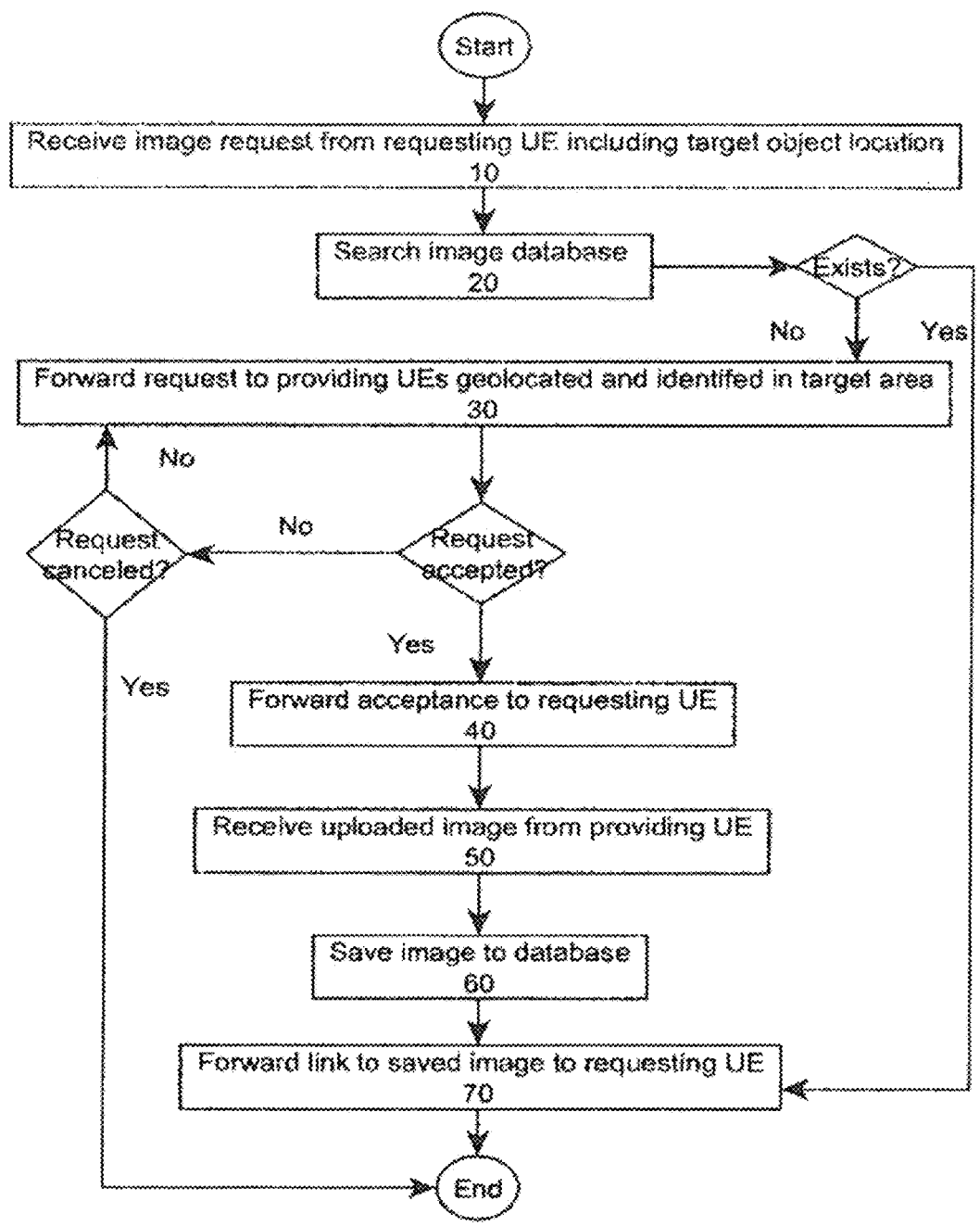
FIG. 2 is a flow chart illustrating an exemplary method of implementing the present invention on a host computer.

FIG. 2 describes an exemplary method performed on a host computer such as host computer 100 of FIG. 1 according to a preferred embodiment of the present invention. First, a request for an image is received 10 from a user through a requesting UE (such as UE 200 in FIG. 1). In one embodiment a map is displayed for the requesting user on the requesting UE, and the requesting user selects (for example by tapping or a touch screen) a location on the map in order to describe the target location of the request. In another embodiment the users describes the location with keywords (e.g. Eiffel Tower) or location (e.g. corner of Fifth and Main), in which case the keywords should describe the location with sufficient detail so as to allow the host computer to identify the target object/location with reasonably accuracy if a location is selected on a map, the location coordinates corresponding to the selected region are transmitted to the host computer. If keywords are entered, the host computer may need to translate the target object/location described to corresponding geographical location coordinates. Next, in a preferred embodiment a searchable image database (which can be local or remote) is searched 20 for images tagged with keywords and/or location coordinates matching the target object/location, and any other specific details as may be provided in the request. If a matching image is found, a download link for downloading the image is generated and forwarded 70 to the requesting UE.

If no match is found, a fulfillment request including a description of the required image and any specific details of the image sought is sent 30 to one or more available providing UE (such as mobile camera 201 in FIG. 1) which are determined by geolocation to be located within the predetermined distance from the target object/location. In one embodiment, the predetermined distance is set globally by the host computer. In another embodiment, the predetermined distance is individually set by a providing UE prior to receiving requests for images, for example by indicating in a use settings screen on the UE the maximum distance the user of the providing UE is willing to travel to an object or location in order to capture an image for a requesting UE. In yet another embodiment, the predetermined distance is specified by requesting UE in the request. Preferably, UE are continually for periodically at regular predetermined intervals) geolocated in order to identify is suitably located providing UE, to which a fulfillment request is then sent. Preferably the above steps are repeated until the desired image is acquired or the request is canceled. The request may be canceled by the requesting UE or by the host computer in the case where repeat attempts to acquire an image in the above manner fail. In one embodiment the request may be automatically canceled after the expiration of a predetermined time limit or deadline for acquiring the image.

In a preferred embodiment, UE which intend to deliver the requested image send a confirmation to the host computer prior to either capturing or uploading an image. Preferably such confirmation indicates a willingness to fulfill the request rather than a commitment or obligation. Preferably, after having received at least one such confirmation from at least one UE, host computer sends 40 the requesting UE notice of having received such confirmation. After having received the first confirmation, the host computer may or may not continue to send fulfillment requests to identified providing UE.

Next, a providing UE captures the requested image and uploads the captured image to the host computer. The host computer receives 50 the uploaded image, tags it using location coordinates and/or searchable keywords and saves 60 the received image to a searchable image database. Finally, the host computer sends 70 to the requesting UE a download link to the saved image.

Figure 3:
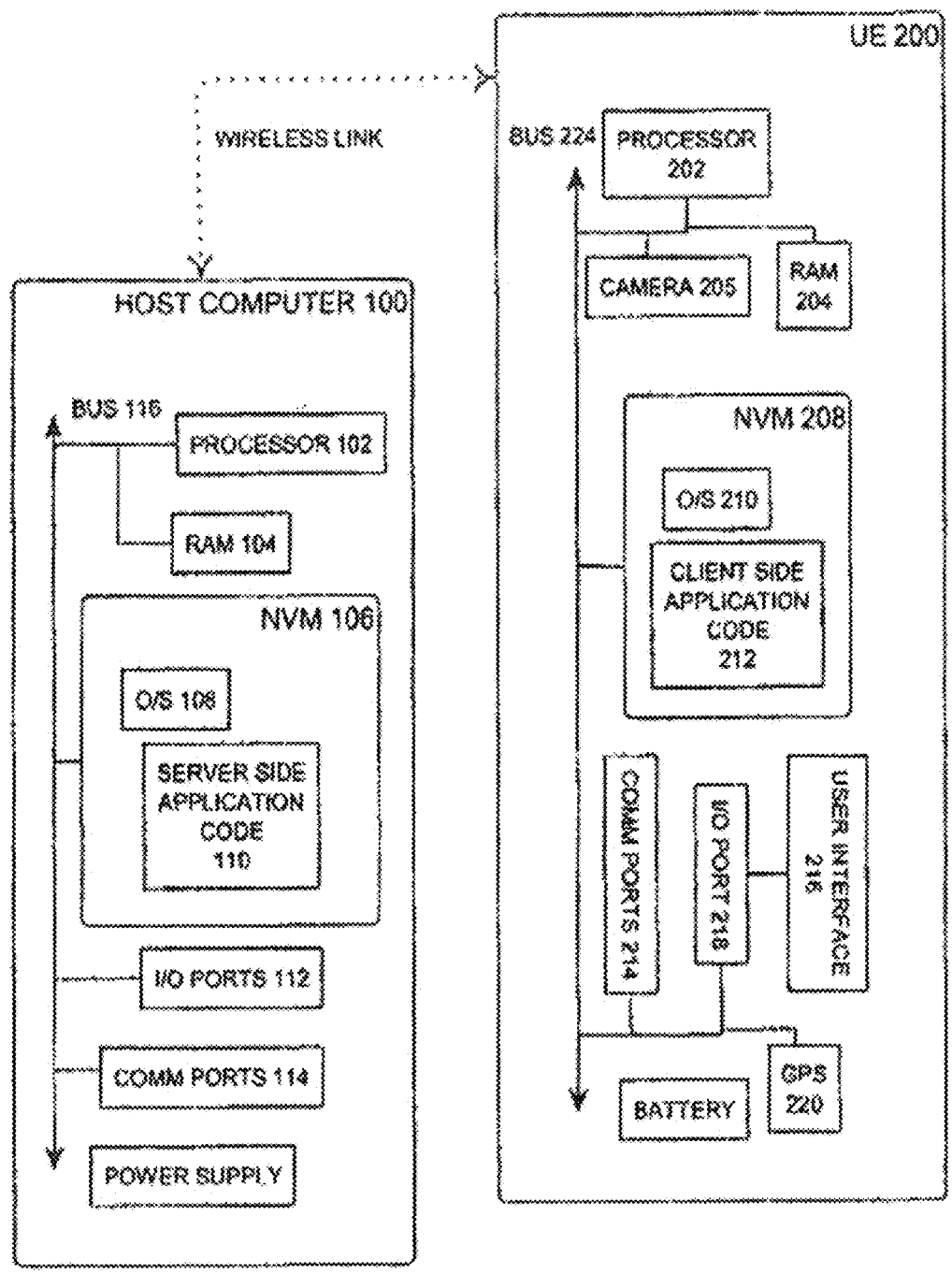
FIG. 3 is a high level partial block diagram of an exemplary host computer and UE which are configured for the present invention.

FIG. 3 is a high-level partial block diagram of an exemplary host computer 100 and UE 200 which are configured to implement the present invention. Only components of host computer 100 and UE 200 that are germane to the present invention are shown in FIG. 3. In FIG. 3, UE 200 is configured to perform the tasks of either a requesting LIE or a providing UE.

Host computer 100, is, for example, a server, which includes one or more processors 102, a random access is memory (RAM) 104, a non-volatile memory (NVM) 106, communication ports 114, and input/output (I/O) ports 112 all communicating with each other via a common bus 116.

In NVM 106 are stored operating system (WS) code 108 and server-side application code 110. Server-side application code 110 includes computer readable executable code for implementing the host computer functions of the present invention such as those described above. Under the control of O/S 1118, processor 102 loads server side application code 110 from NVM 106 into RAM 104 and executes server-side application code 110 in RAM 104, causing host computer 100 to perform host computer functions for providing on demand photos and videos to mobile devices as described above.

UE 200 includes one or more processors 202, a random access memory (RAM) 204, a non-volatile memory (NVM) 208, a camera 205, communication ports 214, and an input/output (I/O) port 218 till communicating with each other via a common bus 224. I/O port 218 is in operative communication with a user interface 216 to display output (for example on a display screen) and receive input (for example through a touch capacitive display screen). UE 200 may optionally include a geolocation receiver such as a GPS receiver 220. In NVM 208 are stored operating system (O/S) code 210 and client-side application code 212. Client-side application code 212 includes computer readable executable code for implementing the UE functions of the present invention such as those described above. Under the control of O/S 210, processor 202 loads client-side application code 212 from NVM 208 into RAM 204 and executes client-side application code 212 in RAM 204 causing UE 200 to perform UE functions for requesting and providing on demand photos and videos to mobile devices as described above.

Figure 4A:
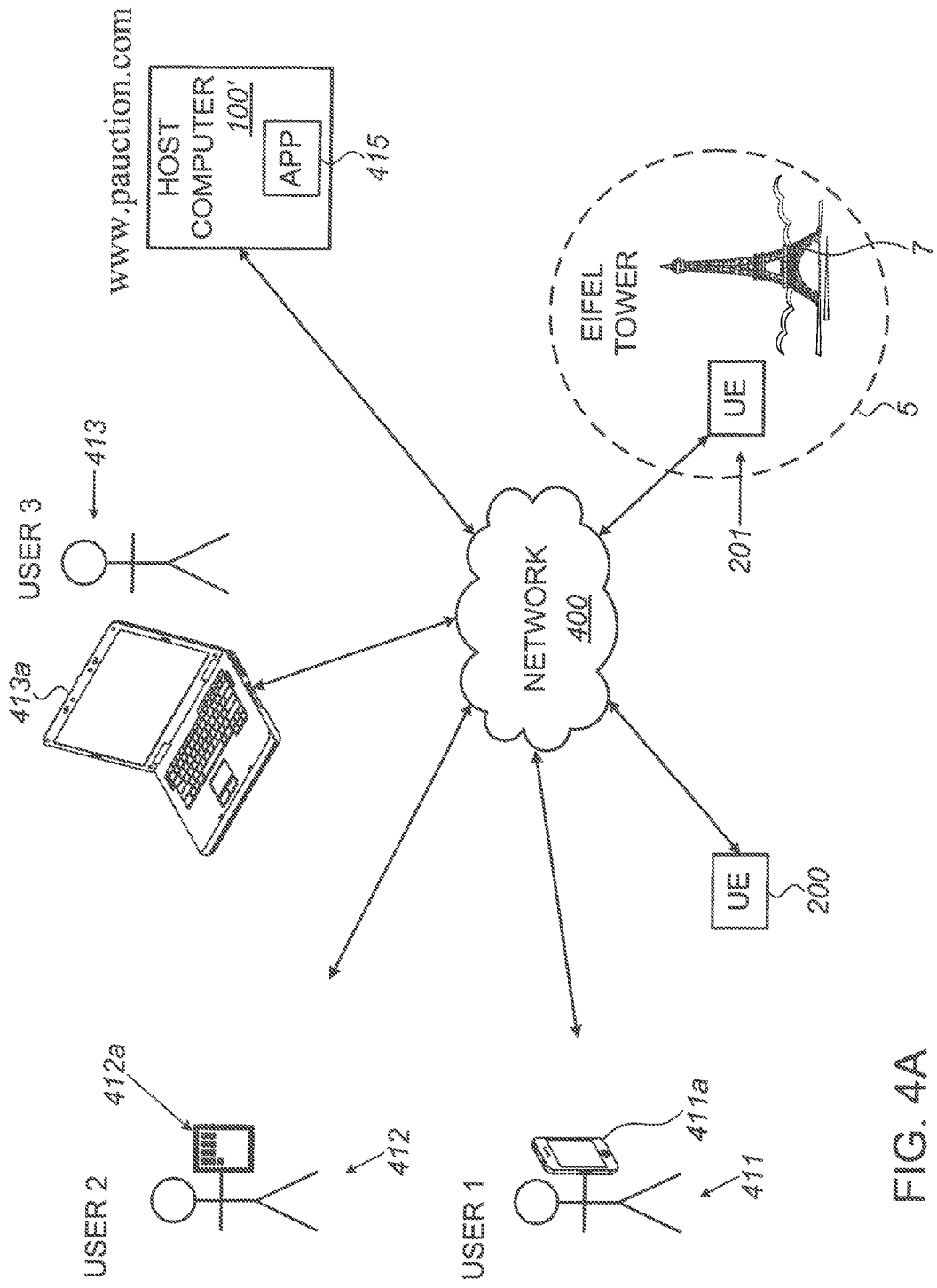
FIG. 4A is a high level diagram illustrating an environment for administering auctions and sales in accordance with embodiments of the present invention.
Figure 4B:
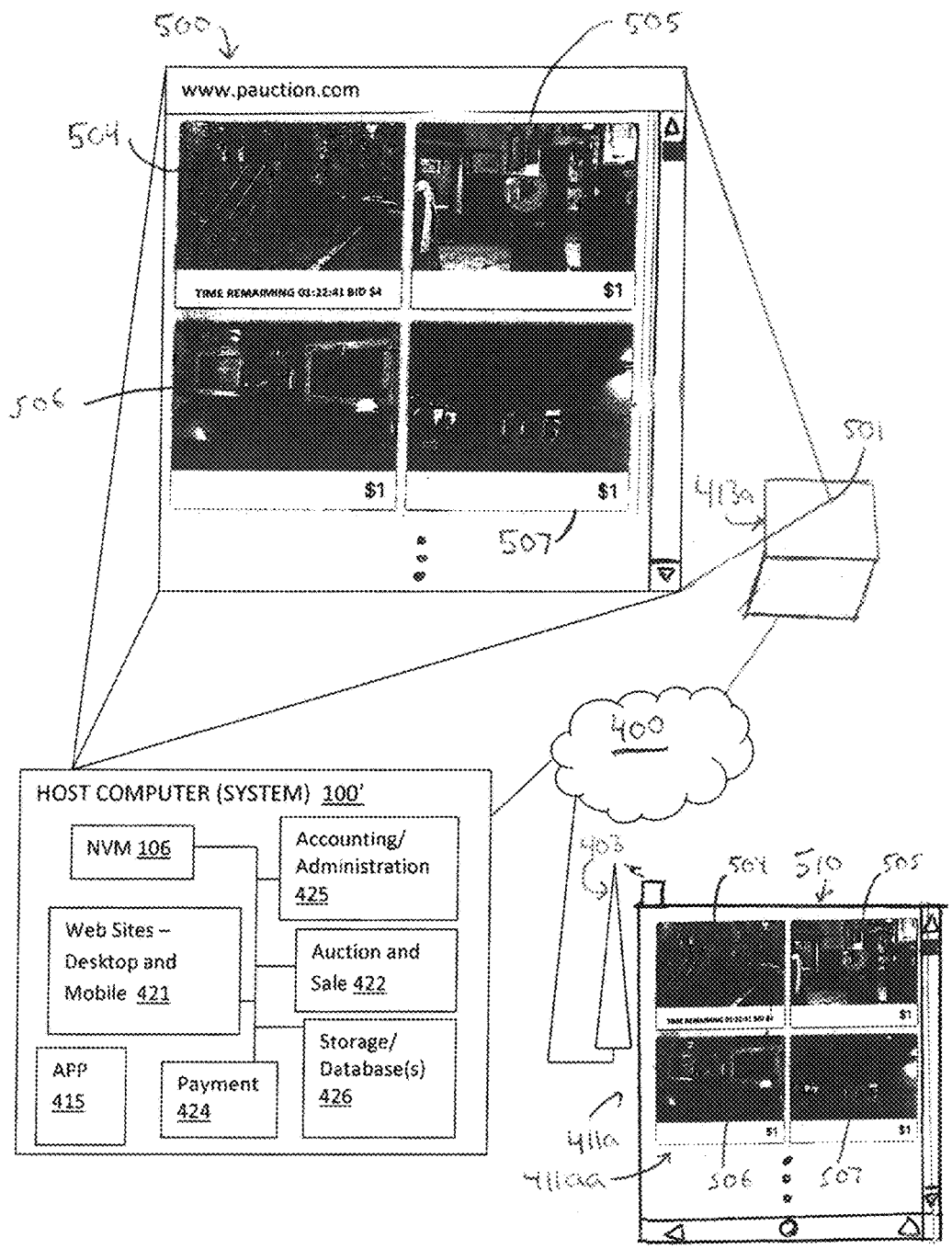
FIG. 4B is a diagram of the host computer of FIG. 4A.

Turning now to FIGS. 4A and 4B, the host computer 100', for example, a server, may now take the stored images, for example, as photographs and videos, including movies, which have been tagged with location data, time, and other search terms, and put this image as well as other saved images, as items up for auction, sale or combinations thereof. The host computer 100', representative of one or more computers for performing embodiments of the present invention, is linked to a network 400. The UE 200 is also linked to the network 400. Users, for example, user 1 411, user 2 412, and, user 3 413, represent multitudes of users, who are linked to the auction on the server 100' over the network 400, via their user equipment (UE), such as a smart phone (mobile device or mobile computer) 411*a* (via a cellular tower 403), tablet 412*a*, and lap top computer 413*a*, as well as a desktop computer or PC (personal computer) (not shown). The host computer 100' also stores a downloadable application (APP) 415, which when downloaded on a user (e.g., client) computer 411*a*, 412*a*, 413*a*, maps to the host computer 100' and provides the user's computer with items, e.g., photographs and videos (including movies), for auction and/or sale, the auction and/or sale, for example, in real time. The APP 415 is typically also available through application servers (not shown) linked to the network 400. The host computer 100', for example, has the URL www-.pauction.com.

The network 400 includes a communications network, such as a Local Area Network (LAN), or a Wide Area Network (WAN), including public networks such as the Internet. The communications network may be one or more networks, and may be a combination of networks and/or multiple networks including, for example, cellular networks. "Link" and "linked" as used herein include both wired and/or wireless links, either direct or indirect, and placing the host computer 100', in electronic and/or data communications with the UE 200, 201, as well as the user computers 411*a*, 412*a*, 413*a*.

The host computer 100' is similar to the host computer 100 detailed above and shown in FIGS. 1-3, but includes additional modules 421, 422, 424, 425 and storage media 426, linked either directly or indirectly to the NVM 106 or each other, necessary for performing and administering auctions and/or sales of items, digital representations in the form of, for example, photographs and videos (including, for example, movies). These modules 421, 422, 424, 425 are, for example, software, hardware or combinations thereof, for providing instructions to processors in the host computer 100' for performing the processes of the invention, as shown in FIG. 4B, including those of the auction/sale of the invention.

As shown in FIG. 4B, in addition to the NVM 106 (other components from host computer 100 are not shown) the host computer 100' includes a web site module 421, for supporting and administering web sites/web pages associated with the auction and/or sale in accordance with the present invention. There is an auction and sale module 422, for administering the auction and associated sales detailed below, including bid handling and processing, coordinated with the web sites 421 module, and coordinating payment with the payment module 424, and, an accounting/administration module 425, which handles user accounts and allocates funds to the system and various users, as detailed, below, for example. The aforementioned modules 421, 422, 424, 425 perform processes automatically and, for example, in real time.

There is also storage media 426, which stores data, for example, in databases, metadata, and the like, associated with the auctions and or sales of the invention, generated by the modules 421, 422, 424, 425, or from outside of the host computer 100'. The host computer 100' defines a system, and is also known as a "system" (the terms "host computer 100'" and "system" used interchangeably herein), for performing the processes of the invention, including the auction, as disclosed herein. Once the web site www.pauction is accessed, via the browsing application of the respective user 411, 412, 413 computer 411*a*, 412*a*, 413*a*, a web page 500, e.g., the home page for the web site www.pauction.com (along the network 400), hosted, for example, by the host computer 100', appears on the display screen of the requisite user computer 411*a*, 412*a*, 413*a*, as shown in FIG. 4B. For example, the web page 500 appears as a screen display 501 or graphic, on the computers, e.g., tablet 412*a* and laptop 413*a* computers, as well as a desktop PC. Also, for example, the mobile computer 411*a* supports the mobile screen display 510, corresponding to the web page 500, on the touch screen 411 as of mobile computer 411*a*. The screen displays 501 (tablet, laptop desktop) 510 (corresponding mobile display 510) includes images, for example, photographs 504, 506, 507, and videos 505 (also referred to as photographs 504, 506, 507 and videos 505), which when activated, by a "contact" or swipe" on a touch screen (of a tablet computer, smartphone), or "click", from a mouse or other pointing device, or the like, on the image 504-507 (which overlies an activatable link, for example, to the auction and sale module 422), allowing the user to select various options. These options include, for example, bidding on a photo or video, or seeing how long the photo or video is exclusive to a purchaser, for example, photograph 504, or seeing which photos/videos are available for purchase, for example, on a non-exclusive basis, for example, video 505 and photographs 506, 507. The photographs and videos (representative images thereof) 504-507 are shown, for example, in chronological order of receipt by the system, and accordingly, display at the top of the respective screen display 501, 510 (e.g., the photographs and videos 504-507 are above the dotted vertical line indicating that the remainder of the screen display is below the photographs and videos 504-507, and is reachable by scrolling down on the respective screen display), for both desktop 500 and mobile 510 applications. The mobile applications are via the application 415 downloaded on the mobile computer 411*a* of the user 411 (as shown on the touch screen display 411*aa* of the mobile computer 411*a*).

Staying in FIG. 4B, photograph 504 is available for purchase in an auction by a bid. The image of the photograph 504 also includes the time in which bidding is still open (for example, typical bidding periods are two hours), which is, one hour, 22 minutes and 41 seconds remaining with the current winning bid being $4. For example, a user seeking to bid for the photograph 504, activates the image of the photograph 504 in either the desktop screen display 501, for example, by mouse "clicking", or the mobile screen display 510, for example, by contacting, swiping, or the like, the image 504 on the device touch screen.

Figure 5A:
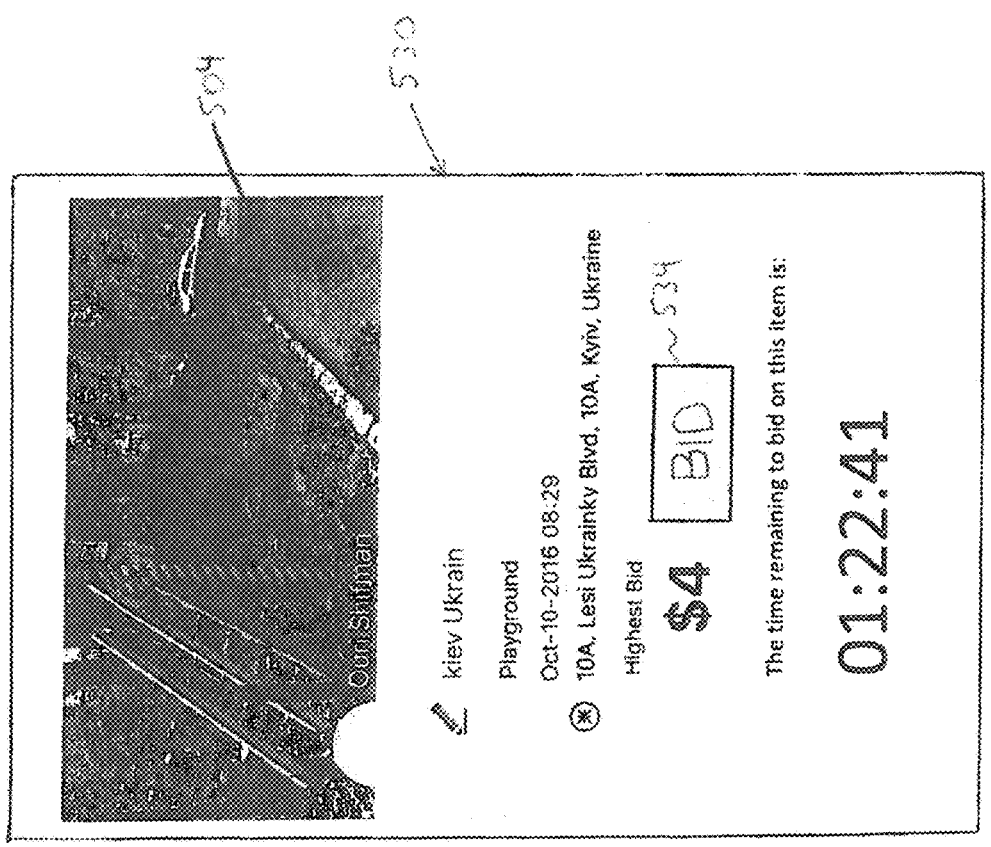

This activation renders the screen display 530 of FIG. 5A to the browser of the requisite computer 411*a*, 413*a*. The screen display 530, along with screen displays 540 and 550, are representative of screen displays for all computers, e.g., desktop, laptop, tablet, mobile (e.g., screens and touch screens) as presented on the respective users' computers.

The image, e.g., photograph or video, for example, of the photograph 504 is shown along with terms of the auction, a box 534 that when activated allows the user to bid on the item, e.g., the photograph and its digital data (representation) corresponding to the displayed image of the photograph 504. The image of the photograph 504 as displayed, is typically watermarked and in low resolution, or with other security features, to discourage users from scraping these photographs and using them in an unauthorized manner (also for the off-auction exclusive period and sale, both detailed below). The user can enter their bid, by activating a bid button 534, and then following instructions and entering input to complete the bid, as well as see the terms of each auction, such as the times, opening/closing of the bid periods, rights to the photographs, e.g., exclusive/nonexclusive.

Once a bid is accepted, the host computer 100', then transmits a message to the user with the winning and accepted bid, and payment is made by conventional online payment processes, such as Pay Pal®, credit cards, bank transfers and the like. Once payment is approved, the item, for example, the actual photograph (digital representation thereof) of the image of the 504, has its status updated in the host computer system, and this updated status is shown in the screen display 501/510 of FIG. 5B-1, as for example, "EXCLUSIVE FOR 47:56:38", indicating that the photograph, shown by its image 504, is exclusive to a purchasing user, for a predetermined period, for example, 48 hours, with this specific photograph 504 exclusive to its purchaser for 47 hours, 56 minutes and 38 seconds. As the payment immediately caused a status change of the photograph 504 to exclusivity, the photos/video 504-507 of the screen display 501/510 of FIG. 5B-1 are positioned on the computer screen at relatively the same position as in FIG. 4B.

Figures 1, 5B:
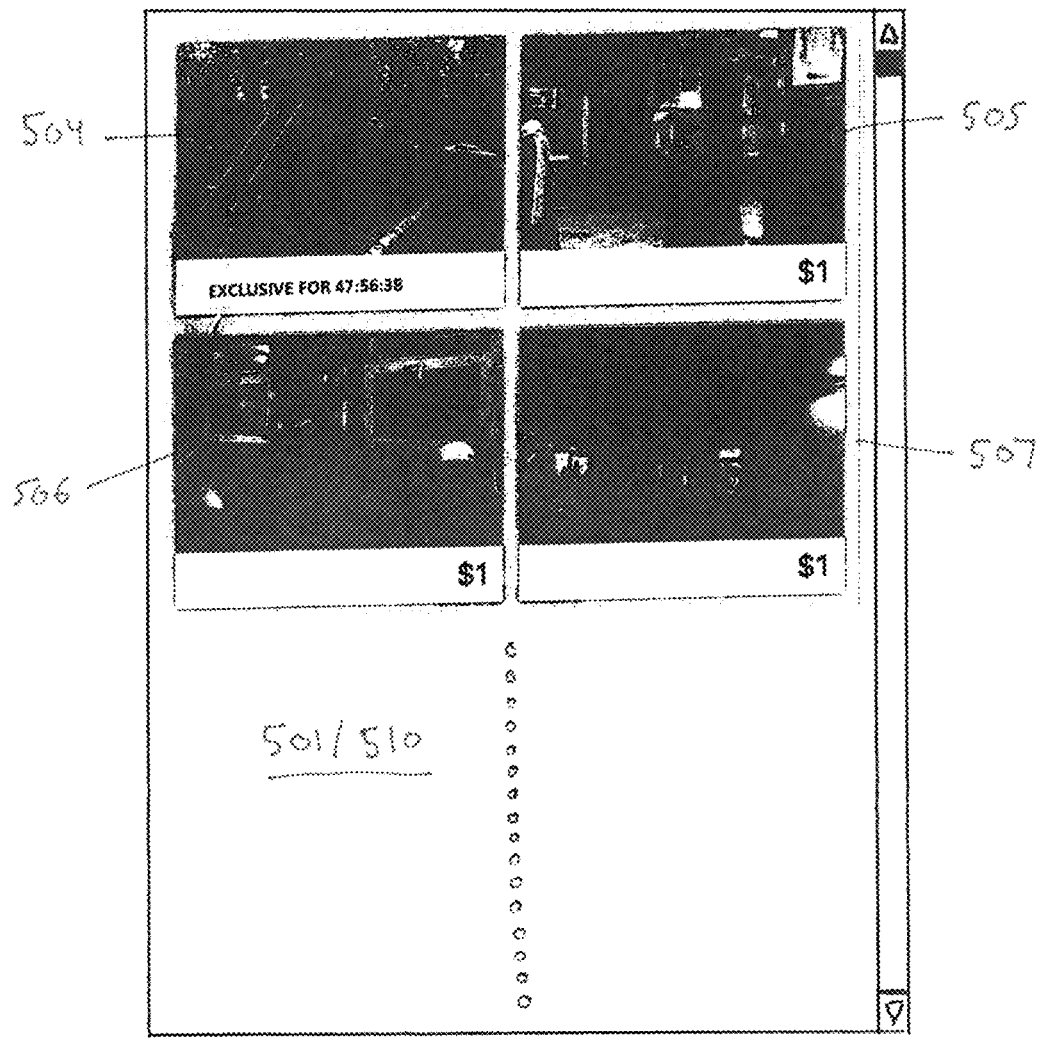

When image 504 in the screen display 501/510 of FIG. 5B-1 is activated, the screen display 540 of FIG. 5B-2 is rendered to the requisite browser of the user's computer device. This screen display 540 indicates that the photograph, shown by its image 504, is exclusive to a purchasing user, for a predetermined period, for example, 48 hours, with this specific photograph exclusive to its purchaser for 47 hours, 56 minutes and 38 seconds.

Figures 2, 5C:
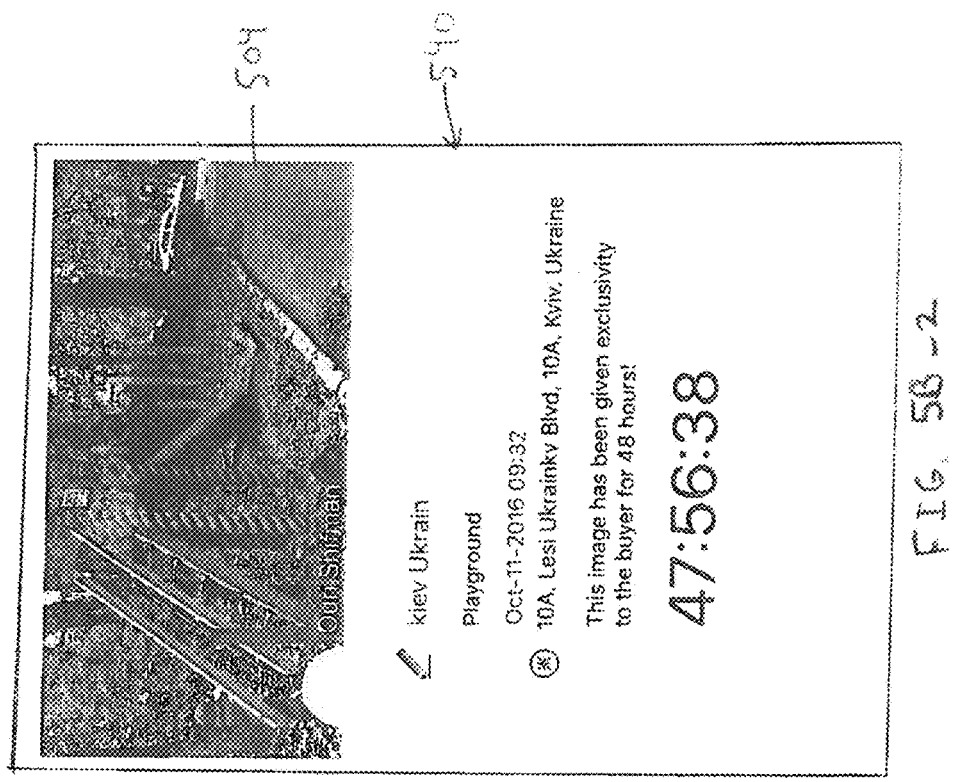
Figures 1, 5C:
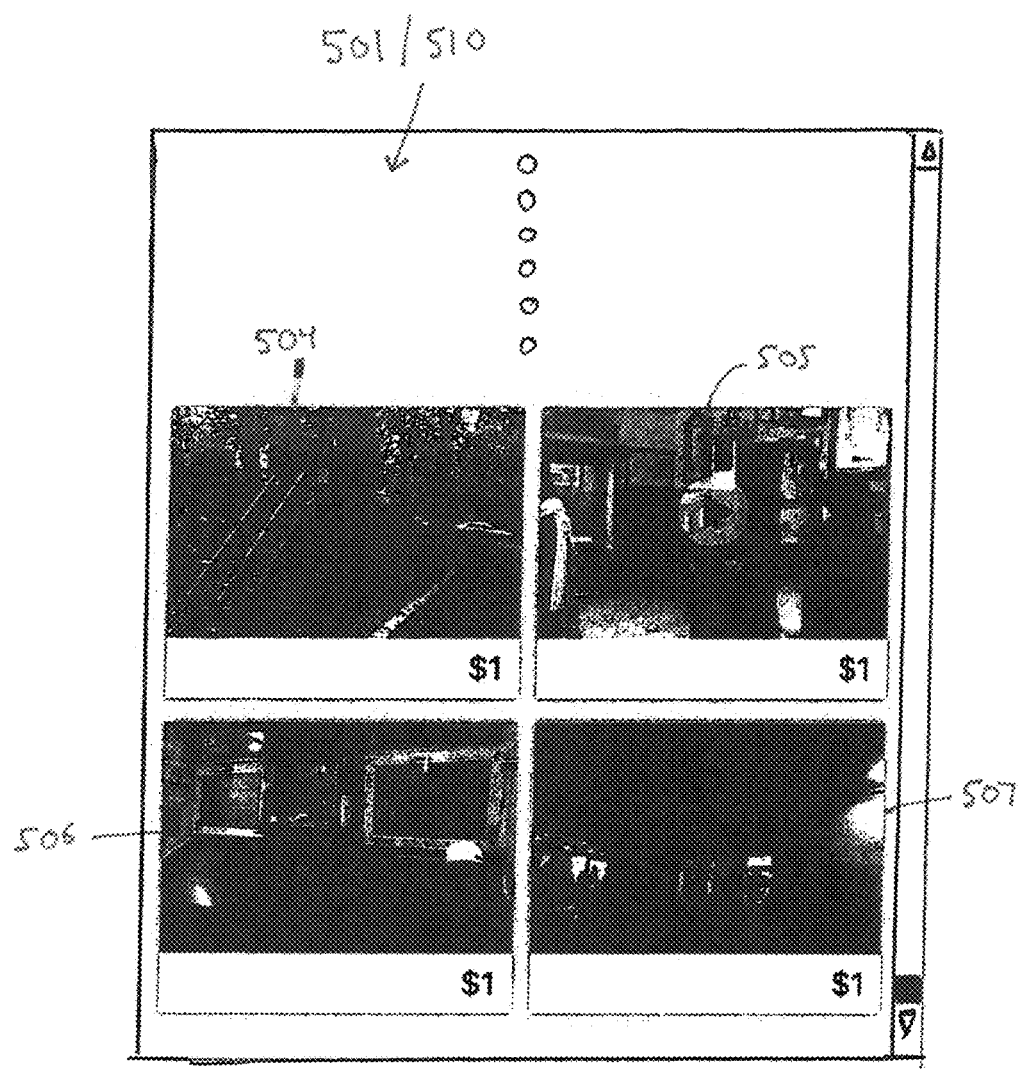
Figures 2, 5C:
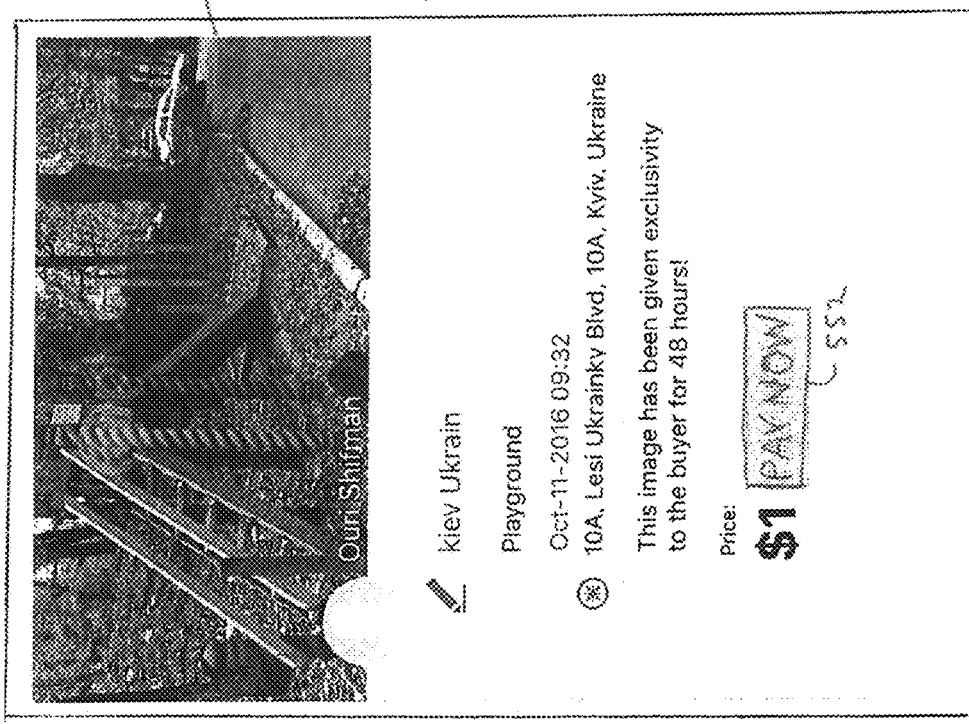

Turning to FIG. 5C-1, a screen display 501/510 shows the photograph 504, at a later time (as illustrated by the photograph 504 being positioned low on the screen display, below the vertical dotted line) when the photograph 504 is no longer exclusive (to the auction purchaser), and no longer up for bid. For example, the item, photograph 504, is older than a predetermined time, such as 72 hours, and has gone off auction. Accordingly, the photograph 504 is accessed by scrolling down on the screen display 501/510, as time has passed since the photograph 504 was no longer exclusive. The photograph 504 is now placed into a general sale category, and offered for sale at a fixed price, e.g. one dollar, for a predetermined time, typically with non-exclusive rights. This "sale" may be with the auction, as described herein, or independent of any auctions.

When the image 504 in the screen display 501/510 of FIG. 5C-1 is activated, the screen display 550 of FIG. 5C-2 is rendered to the requisite browser of the user's computer device. This screen display 550 is such that the user contacts, swipes or otherwise clicks on the "Pay Now" box 552, and makes payment in accordance with procedures similar or identical to those detailed above, for the auction payment. Once payment is approved, the purchasing user receives the item, e.g., photo/video, for example, photograph 504, free of any watermarks and at high resolution, typically nonexclusively and for a limited period of time.

Revenues can be shared with the requestor, represented by UE 200 and/or the photographer (or videographer), represented by UE 201. Also, the auction can be such that it begins at a predetermined time after the host computer 100 receives the image (digital data representing the image) from the photographing user equipment (UE) 201.

Figure 6:
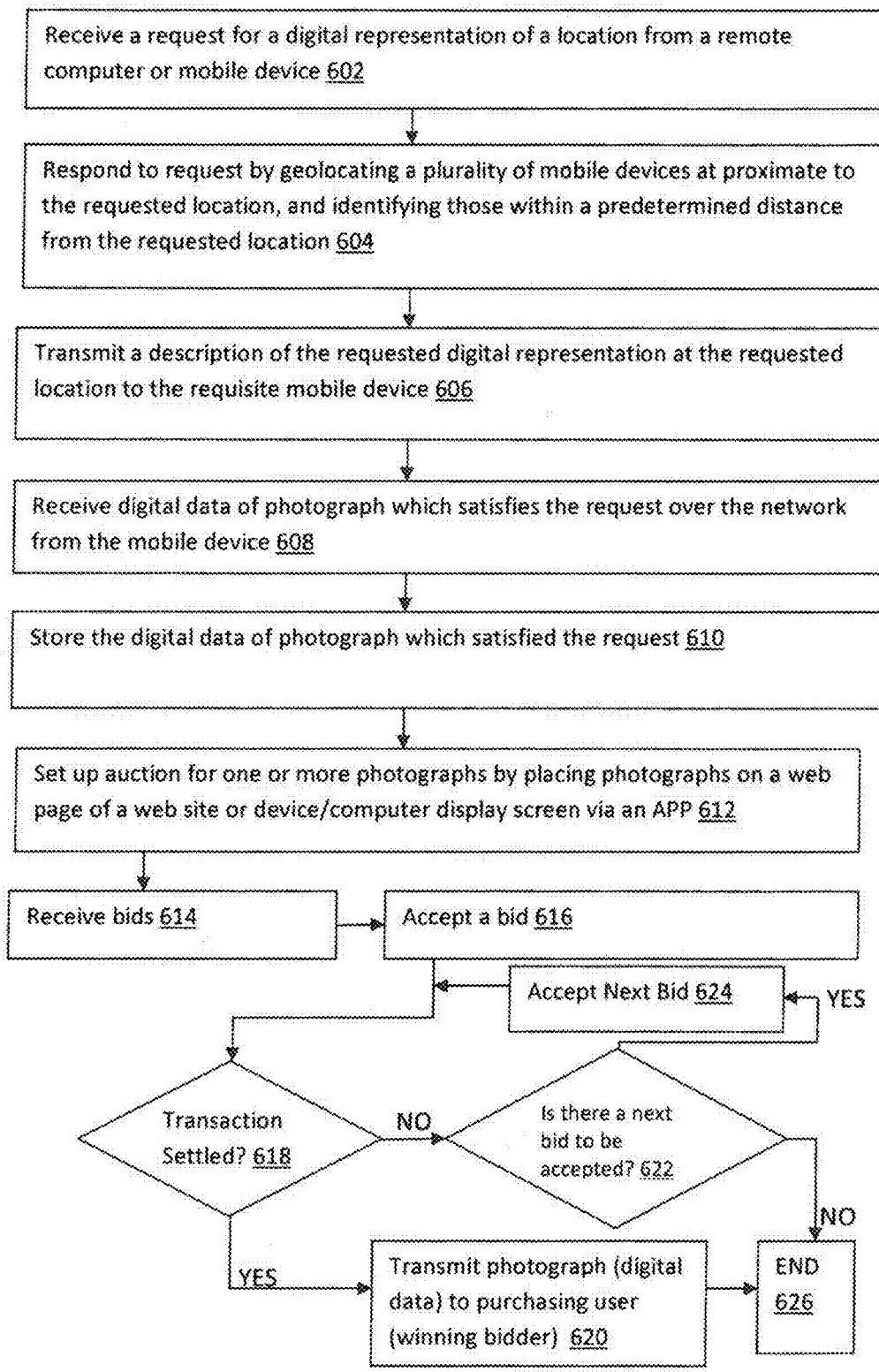

FIG. 6 is a flow diagram, performed by the host computer 100' for establishing and administering the auction, for example, for digital media, including an image such as a photograph, i.e., an auction item. The auction described in FIG. 6 is also suitable for other digital media, such as videos (including movies) and other digital data and digital representations. The processes detailed in FIG. 6 are, for example, performed automatically and in real time. References are also made to FIGS. 4A, 4B, 5A, 5B-1, 5B-2, 5C-1 and 5C-2.

At block 602, the host computer 100' receives, from a requesting computer or computer device, such as mobile device located in a first geographic location, e.g., UE 200, or from the system of the host computer 100', a request for a digital representation depicting a second geographic location, at least partially over the network 400. At block 604, the host computer 100' responds to the request by geolocating a plurality of providing mobile devices, e.g., UE 201, and identifying a subset of the plurality of providing mobile devices, e.g., UE 201, which are located within a predetermined distance 5 from the second geographic location 7. The process moves to block 606, where the host computer 100' transmits a description of the requested digital representation, to the selected mobile device, e.g., UE 201, at the second geographic location 7.

Moving to block 608, the host computer 100' receives a digital representation, e.g., data of a photograph, which satisfies the request, over the communications network. The digital data for the photograph is then stored by the host computer 100', at block 610.

The host computer then sets up the auction, at block 612. The auction is, for example, conducted electronically, and accessed via the network 400. The auction includes placing the photographs for the auction on web pages 500 of the web site, or onto the screen of the user mobile device, via the application (APP) 415, with the terms and conditions for the auctions and the rights associated with each item, e.g., photograph, represented by the image 504 (and its underlying link). The photograph is now placed up for auction, for a predetermined time, for example, two hours, with its display, for example, represented by the image 504 for the photograph, in FIGS. 4B and 5A. As described for FIG. 5A above, the details of the photograph (represented by the image 504) up for auction, are shown, in the screen display 530, along with other terms and conditions of the auction for this photograph, including the current bid amount. Additionally, the photographs are, for example, watermarked, of low resolution, or other security features, to discourage users from scraping these photographs and using them in an unauthorized manner.

At block 614, bids are received from users, who bid for the photographs, typically by communications over the network 400. However, the host computer 100 and web site (of which the web page 500 is a part of) may be configured such that an administrator can accept bids over the telephone, either orally, or via messaging services, such as texting, SMS, WhatsApp®, and social media, such as Facebook® and the like.

The host computer 100 then accepts a bid, at block 616. A transaction settlement process (e.g., payment and confirmation thereof) begins, at block 618. Should the settlement succeed, for example, be completed with payment satisfied in a predetermined time, for example approximately 20 minutes, the digital data for the photograph is transmitted to the purchasing user, at block 620, in accordance with the rights purchased. The purchased photograph is free of the watermark, and is typically in high resolution. The purchaser has exclusive access to this photograph for a predetermined period, for example, 48 hours, as shown, for example, in FIGS. 5B-1 and 5B-2, as detailed above. For example, after the 48 hour period, the photograph is again posted on the web site 500 or the application and made available to multiple users, contemporaneous in time, for example, a fixed price, such as one dollar, as shown for example, in FIGS. 5C-1 and 5C-2. From block 620, the process moves to block 626, where it ends.

Returning to block 618, should the transaction fail, e.g., not concluding within the predetermined time of 20 minutes, or failing due to non-payment or payment not being accepted, the process moves to block 622. At block 622, it is determined whether there is a next bid, for example, the next highest bid to the previous bid, to be accepted. If no, the process moves to block 626, where it ends. In this case, the item may then go straight to sale. However, at block 622, if yes, the process moves to block 624, where the next bid is accepted, and resuming from block 624, the process moves to block 618 to settle the transaction, as detailed above.

Returning to block 626, with the auction now ended, the photograph may be offered for sale, as part of a sale process. For example, the photograph 504 is again posted in a screen display 501/510 of FIG. 5C-1 and 550 of FIG. 5C-2 (the screen displays electronically linked to each other via photograph 504), and is available for sale to multiple users, contemporaneous in time.

While the process described above, in blocks 602-626 has been described for a photograph (including digital data representing a photograph) or video, the aforementioned process is also applicable for movies, and the like, and the digital data thereof, as well as for sounds, for example, sound bytes, smells and the like, which are suitable for being represented digitally, placeable on storage media, and transmittable over networks.

The host computer 100' is also programmed to examine the requests from the various requesting computers, and computer devices, such as mobile devices. Should there be a predetermined number of requests for a certain photograph, at a certain location, this is determined to be an "event". Photographs from "events" are grouped together in auctions and may be sold as packages, for the "event". Also, by noting the "events" the events may be news events, which are not being reported over conventional channels.

While the invention has been described with respect to a limited number of embodiments, it will be appreciated that many variations, modifications and other applications of the invention may be made. Therefore, the invention as recited in the claims that follow is not limited to the embodiments described herein.

The implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system. For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A computer-implemented method of providing an on-demand digital representation of a geographic location comprising:
   (a) receiving, from a requesting computing device located in a first geographic location, a request for a digital representation depicting a second geographic location, at least partially over a communications network;
   (b) responding to the request including:
      geolocating a plurality of providing mobile devices and identifying a subset of said plurality of providing mobile devices which are located within a predetermined distance from said second geographic location; and,
      transmitting to at least one such identified providing mobile device, at least partially over the communications network, a description of said requested digital representation;
   (c) responsive to said transmitting of said description, receiving from at least one such identified providing mobile device, a digital representation which satisfies said request, at least partially over the communications network; and,
   (d) administering an auction for said received digital representation at a web site.

2. The computer-implemented method of claim 1, wherein said administering said auction includes receiving bids for said received digital representation and accepting at least one bid as a winning bid for said received digital representation.

3. The computer-implemented method of claim 2, wherein the entity with the winning bid receives the received digital representation exclusively for a predetermined time period.

4. The computer-implemented method of claim 3, wherein the received digital representation is placed for sale after a predetermined time period.

5. The computer-implemented method of claim 4, wherein the predetermined time period is after the predetermined time period for exclusivity.

6. The computer-implemented method of claim 4, wherein the received digital representation is placed for sale by an image of said received digital representation the being displayed on a web page associated with the web site.

7. The computer-implemented method of claim 1, wherein an image of the received digital representation is displayed on a web page of the web site, and the web site is accessible over the communications network.

8. The computer-implemented method of claim 7, wherein the web page includes a mobile web page.

9. The computer-implemented method of claim 7, wherein the web page includes a desktop web page.

10. The computer-implemented method of claim 1, further comprising:
if no digital representation is received in response to said transmitted description of said requested digital representation, repeating step (b) until a termination condition is satisfied.

11. The computer-implemented method of claim 10, wherein said termination condition includes receipt of said digital representation.

12. The computer-implemented method of claim 11, wherein the digital representation includes data for at least one of a photograph, video, and a movie.

13. The computer-implemented method of claim 10, wherein said termination condition includes expiration of a deadline.

14. The method of claim 1, wherein the requesting computing device includes at least one of a smartphone, mobile device, tablet computer, laptop computer, computer or processor based device.

15. A computer usable non-transitory storage medium having a computer program embodied thereon for causing a suitable programmed system to provide an on-demand digital representation of a geographic location, by performing the following steps when such program is executed on the system, the steps comprising:
(a) receiving, from a requesting computing device located in a first geographic location, a request for a digital representation depicting a second geographic location, at least partially over a communications network;
(b) responding to the request including:
geolocating a plurality of providing mobile devices and identifying a subset of said plurality of providing mobile devices which are located within a predetermined distance from said second geographic location; and,
transmitting to at least one such identified providing mobile device, at least partially over the communications network; a description of said requested digital representation;
(c) responsive to said transmitting of said description, receiving from at least one such identified providing mobile device, a digital representation which satisfies said request, at least partially over the communications network; and,
(d) administering an auction for said received digital representation at a web site.

16. The computer usable non-transitory storage medium of claim 15, wherein the administering an auction for said received digital representation includes administering the auction via at least one of a desktop web page or a mobile web page associated with the web site.

17. The computer usable non-transitory storage medium of claim 16, wherein the digital representation includes data for at least one of a photograph, video, and a movie.

18. The computer usable non-transitory storage medium of claim 15, wherein the requesting computing device includes at least one of a smartphone, mobile device, tablet computer, laptop computer, computer or processor based device.

19. A computerized system for administering an auction for digital representations over a communications network, comprising:
a non-transitory storage medium for storing computer components; and,
a computerized processor for executing the computer components comprising:
(a) a computer module for receiving, from a requesting computing device located in a first geographic location, a request for a digital representation depicting a second geographic location, at least partially over a communications network;
(b) a computer module for responding to the request including:
geolocating a plurality of providing mobile devices and identifying a subset of said plurality of providing mobile devices which are located within a predetermined distance from said second geographic location; and,
transmitting to at least one such identified providing mobile device, at least partially over the communications network, a description of said requested digital representation;
(c) a computer module responsive to said transmitting of said description, receiving from at least one such identified providing mobile device, a digital representation which satisfies said request, at least partially over the communications network; and,
(d) a computer module for administering an auction for said received digital representation at a web site.

20. The computerized system of claim 19, wherein the administering an auction for said received digital representation includes administering the auction via at least one of a desktop web page or a mobile web page associated with the web site.

21. The computerized system of claim 19, wherein the digital representation includes data for at least one of a photograph, video, and a movie.

22. The computerized system of claim 19, wherein the requesting computing device includes at least one of a smartphone, mobile device, tablet computer, laptop computer, computer or processor based device.

* * * * *